United States Patent
Lenz et al.

(10) Patent No.: US 12,519,386 B2
(45) Date of Patent: Jan. 6, 2026

(54) DRIVE DEVICE FOR A VEHICLE

(71) Applicants: Volkswagen Aktiengesellschaft, Wolfsburg (DE); AUDI Aktiengesellschaft, Ingolstadt (DE)

(72) Inventors: Andreas Lenz, Wolfhagen (DE); Bjoern Hess, Kassel (DE); Max Possen, Coburg (DE); Marvin Emde, Wabern (DE)

(73) Assignees: Volkswagen Aktiengesellschaft, Wolfsburg (DE); Audi Aktiengesellschaft, Ingolstadt (DE)

( * ) Notice: Subject to any disclaimer, the term of this patent is extended or adjusted under 35 U.S.C. 154(b) by 287 days.

(21) Appl. No.: 18/213,586

(22) Filed: Jun. 23, 2023

(65) Prior Publication Data

US 2023/0421047 A1 Dec. 28, 2023

(30) Foreign Application Priority Data

Jun. 27, 2022 (DE) ............... 10 2022 115 967.1

(51) Int. Cl.
*H02K 7/10* (2006.01)
*H02M 1/08* (2006.01)

(52) U.S. Cl.
CPC ................. *H02M 1/082* (2013.01)

(58) Field of Classification Search
CPC .................. H02M 1/082; H02P 27/08
See application file for complete search history.

(56) References Cited

U.S. PATENT DOCUMENTS 10,523,094 B2 12/2019 Wang et al.

FOREIGN PATENT DOCUMENTS

| CN | 114884282 A | 8/2022 |
|---|---|---|
| CN | 218276379 U | 1/2023 |
| DE | 102019109693 A1 | 10/2020 |
| DE | 102019111594 A1 | 11/2020 |
| DE | 102013216703 B4 | 4/2021 |
| DE | 102022129216 A1 * | 5/2024 |

* cited by examiner

*Primary Examiner* — Karen Masih
(74) *Attorney, Agent, or Firm* — Muncy, Geissler, Olds & Lowe, P.C.

(57) ABSTRACT

A drive device for a vehicle, including an electric machine having a stator housing, on whose outer circumference a pulse width modulated inverter housing is formed, in which a pulse width modulated inverter having at least one pulse width modulated inverter contact is arranged, which is connected to a stator contact via a contact bridge, an AC filter being assigned to the contact bridge to reduce common mode flows and/or for the purpose of EMC shielding. According to the invention, the AC filter is a component separate from the pulse width modulated inverter and may be mounted in the pulse width modulated inverter housing independently of the pulse width modulated inverter.

10 Claims, 6 Drawing Sheets

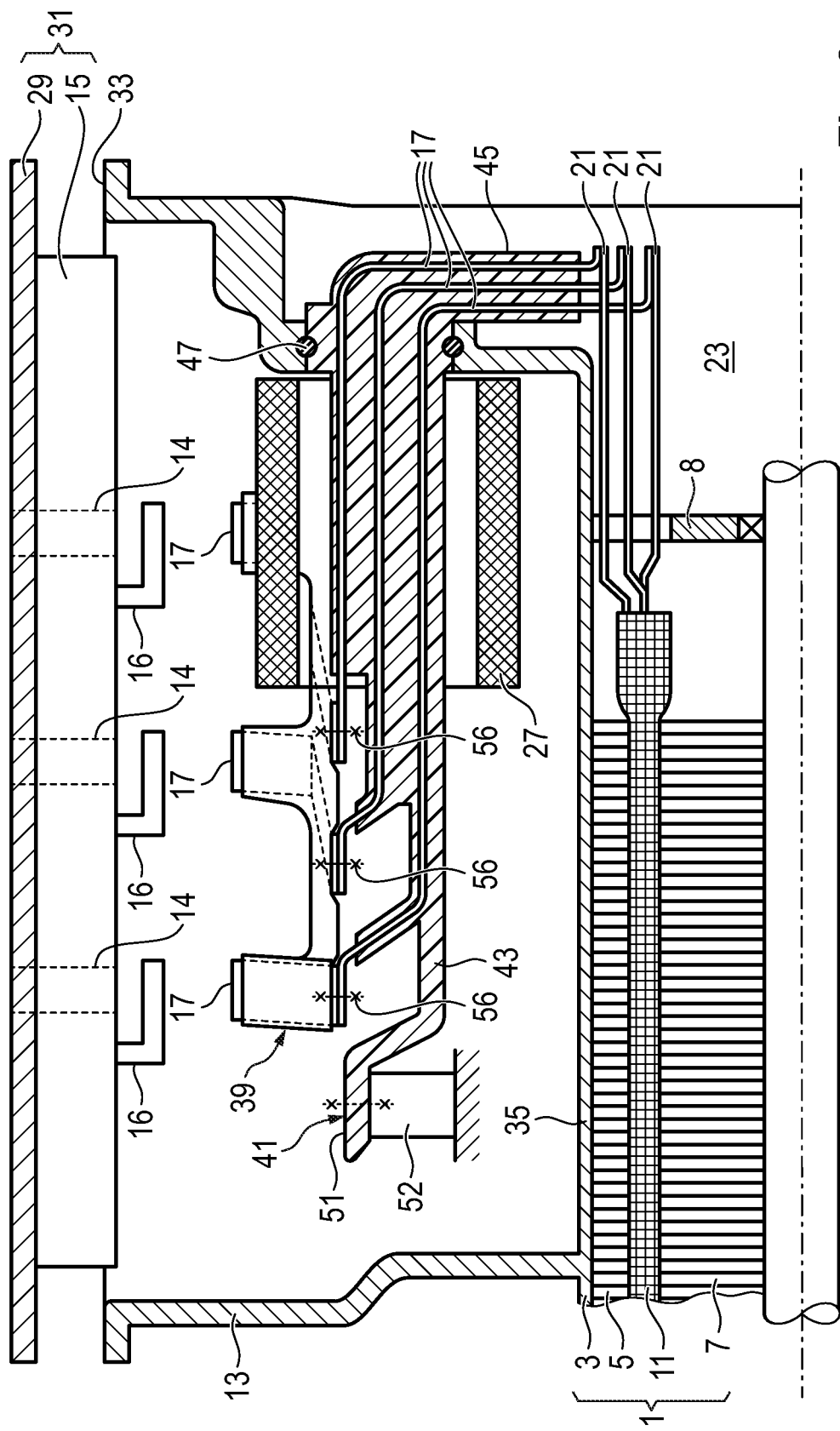

DRIVE DEVICE FOR A VEHICLE

This nonprovisional application claims priority under 35 U.S.C. § 119(a) to German Patent Application No. 10 2022 115 967.1, which was filed in Germany on Jun. 27, 2022, and which is herein incorporated by reference.

BACKGROUND OF THE INVENTION

Field of the Invention

The present invention relates to a drive device for a vehicle, as well as a method for the electrical contacting of a pulse width modulated inverter including a stator of an electric machine of a drive device.

Description of the Background Art

An electrified vehicle axle of a two-track vehicle may include an electric machine, which disengages via a gearbox on output shafts, which lead to vehicle wheels of the vehicle axle. An oil module may also be provided, which supplies the housing interior of the stator housing and/or the gearbox with oil.

A generic drive device for a vehicle includes an electric machine having a stator housing. A pulse width modulated inverter housing is formed on the outer circumference thereof, in which a pulse width modulated inverter is arranged. A pulse width modulated inverter contact is at least connected to a stator contact via a contact bridge. An AC filter is assigned to the contact bridge to reduce common mode flows and/or for the purpose of EMC shielding.

In common practice, the AC filter may be a component of the pulse width modulated inverter. However, an integration of the AC filter into the pulse width modulated inverter may result in package problems, due to the limited installation space situation.

A structural unit for suppressing interference in a pulse width modulated inverter is known from DE 10 2013 216 703 B4. A drive unit including an electric machine is known from DE 10 2019 109 693 A1. A drive arrangement for a vehicle, including an electric machine as well as an inverter device, is known from DE 10 2019 111 594 A1.

SUMMARY OF THE INVENTION

It is therefore an object of the present invention to provide a drive device as well as a method for the electrical contacting of a pulse width modulated inverter, including a stator of an electric machine of the drive device, in which the electrical contacting between the pulse width modulated inverter and the stator may take place with greater degrees of freedom compared to the prior art.

The invention is directed to a drive device of an electric machine, which may drive, for example, an electrified vehicle axle of a two-track vehicle. The electric machine includes a stator housing, on whose outer circumference a pulse width modulated inverter housing is formed. A pulse width modulated inverter (hereinafter referred to as a PWM inverter) is arranged in the pulse width modulated inverter housing. A PWM inverter contact is at least electrically connected to a stator contact via a contact bridge. An AC filter is assigned to the contact bridge for the purpose of EMC shielding and/or to reduce common mode flows. According to the characterizing part of claim 1, the AC filter is no longer an integral component of the PWM inverter. Instead, the AC filter is a component which is separate from the PWM inverter and may be mounted in the PWM inverter housing independently of the PWM inverter. In this way, the AC filter may be positioned in the PWM inverter housing with greater degrees of freedom compared to the prior art, without the arrangement of the AC filter in the PWM inverter housing resulting in package problems.

The AC filter may be designed as a toroidal core, which encompasses the contact bridge. The contact bridge may be provided with a loose design, i.e., with play, due to the toroidal core. The contact bridge includes, for example, one or multiple current-conducting busbars, which are, for example, extrusion-coated with plastic material.

With regard to an easy implementation of the contacting between the pulse width modulated inverter and the stator, the measures described below may be taken: The contact bridge may be provided with a two-part design, including a PWM inverter bridge part on the pulse width modulated inverter side and including a stator bridge part on the stator side. In this case, a three-part assembly is formed between the PWM inverter and the stator for the contacting, which is made up of the two bridge parts as well as the AC filter. The component geometries of the two bridge parts and the AC filter may be designed independently of each other according to the available installation space in the PWM inverter housing. For example, the AC filter may be provided as a variant part which is adaptable to the power class of the particular PWM inverter installed. Alternatively and/or additionally, the two bridge parts may be used across power classes, i.e., independently of the particular power class of the PWM inverter installed.

The PWM inverter housing may be formed on the upper side of the stator housing. A free space may be formed between the PWM inverter underside and a PWM inverter housing base, in which the AC filter may be arranged in an installation space-saving manner. The two bridge parts are preferably electrically connected to each other within the PWM inverter housing, i.e., within the aforementioned free space, for example via a screw connection.

The housing interior of the stator housing can be cooled with oil, particularly in the case of a wet-running electric machine. In this case, a contact housing may be situated axially upstream from the stator housing, which is designed as a wet chamber to which oil may be applied. The at least one stator contact is arranged in the contact housing. In contrast, the PWM inverter housing interior may form a dry chamber. The stator bridge part may be electrically connected to the stator contact in the contact chamber. In addition, the stator bridge part may be guided from the contact chamber into the PWM inverter housing interior via a housing passage. A seal may be formed between the housing passage and the stator bridge part, which separates the dry PWM inverter housing interior media-tight from the wet contact chamber.

For example, the stator bridge part may be designed as an angle profile. In the installation position, the angle profile may have a horizontal leg and a vertical leg. The horizontal leg of the stator bridge part extends into the PWM inverter housing interior and is guided through the housing passage. The vertical leg of the stator bridge part, on the other hand, extends into the contact chamber and is electrically connected to the stator contact.

The PWM inverter, together with a PWM inverter housing cover, may form a one-part cover assembly. The cover assembly may be mounted in a setting direction on an upwardly open housing opening of the PWM inverter housing.

The electrical contacting between the PWM inverter and the stator of the electric machine may preferably be carried out in a process sequence whose process steps are described below: In a first process step, the AC filter may be mounted as a separate component in the still empty PWM inverter housing interior. In a second process step, the stator bridge part may then be inserted in an insertion movement from the contact chamber, through the housing passage, into the PWM inverter housing interior. Once the insertion movement has been completed, the horizontal leg of the stator bridge part extends with a projection beyond the AC filter in the insertion direction. In a third process step, the vertical leg of the stator bridge part may be electrically connected to the stator contact. A fourth process step then follows, in which the PWM inverter bridge part is mounted in the PWM inverter housing interior. The PWM inverter bridge part is also electrically connected to the horizontal leg of the stator bridge part, in particular to the at least one busbar, which is exposed on the aforementioned projection of the horizontal leg. In a subsequent fifth process step, the PWM inverter is inserted into the PWM inverter housing, and the PWM inverter contact is electrically connected to the PWM inverter bridge part.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 4 to 6 show views, based on which a process sequence is illustrated for providing an electrical contacting between the pulse width modulated inverter and a stator of an electric machine.

DETAILED DESCRIPTION

Figure 1:
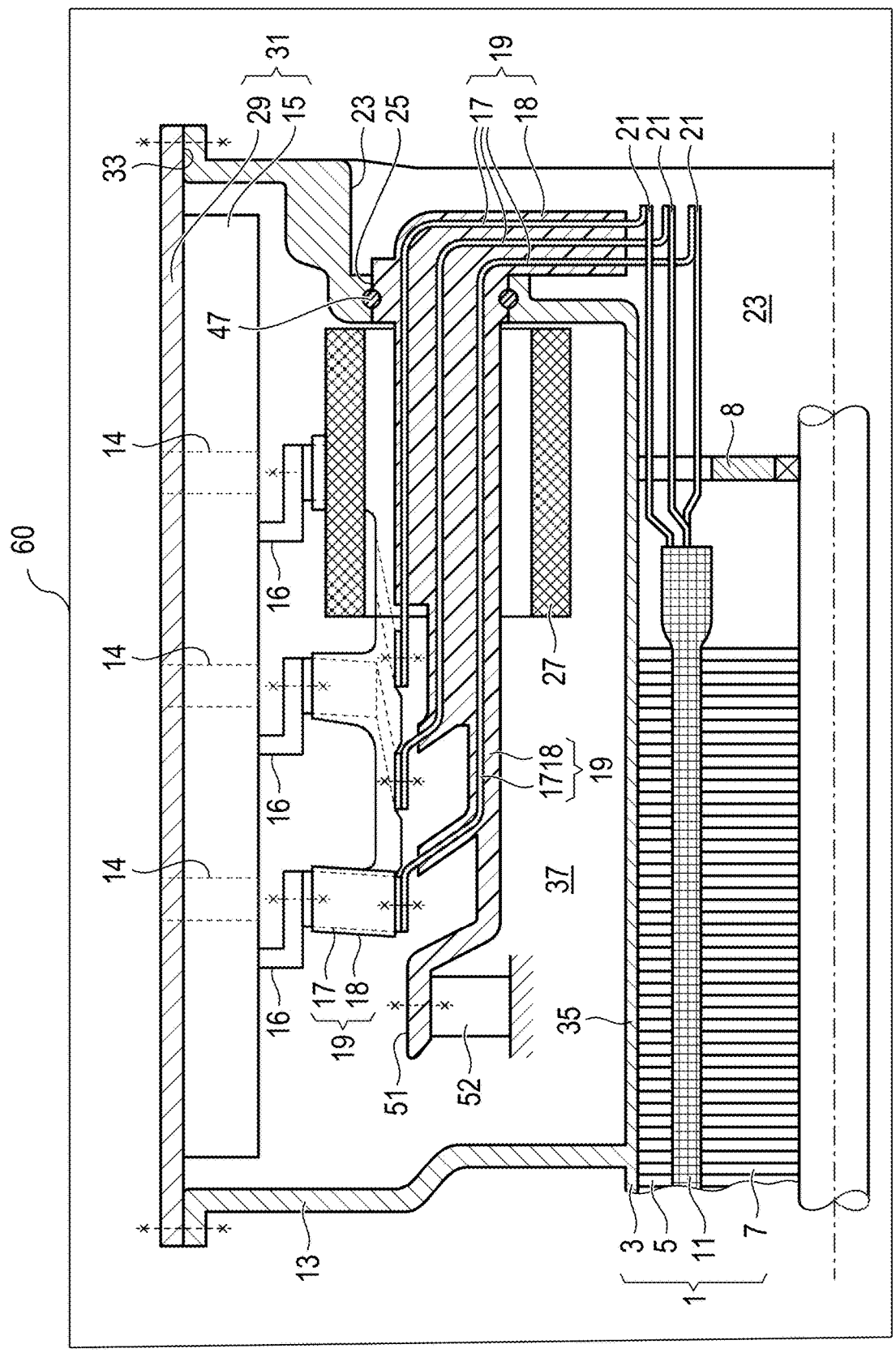
FIG. 1 shows a sectional representation of a drive device, including a mounted pulse width modulated inverter.

A drive device for a vehicle axle of a two-track vehicle 60 is indicated in FIG. 1. The drive device includes an electric machine 1, which disengages via a gearbox on vehicle wheels of the vehicle axle. The drive device also includes an oil circuit, with the aid of which the housing interior of stator housing 3 of electric machine 1 is supplied with oil. Stator 5, including a rotor 7, interacting therewith, is arranged in stator housing 3 of electric machine 1. The rotor shaft thereof is rotatably supported on a stator housing wall 8. Stator 5 also includes a multiplicity of windings 11, which are implemented, for example, as hairpin windings.

A PWM inverter housing 13 is formed on the upper side of stator housing 3, in which a three-phase pulse width modulated inverter 15 is arranged. The latter includes three PWM inverter contacts 16, which are electrically connected to stator contacts 21 via busbars 17 of a contact bridge 19. With the exception of their contact points, busbars 17 are extrusion-coated with plastic material 18 (FIG. 1). In FIG. 1, stator contacts 21 are stator hairpin windings, which project from stator 5, via housing openings of stator housing wall 8, into a contact housing 23, where they are connected to busbars 17 of contact bridge 19. The PWM inverter housing interior is a dry chamber, while the contact chamber delimited by contact housing 23 is a wet chamber, to which oil is also applied.

As is further apparent from FIG. 1, contact bridge 19 extends from the PWM inverter housing interior, through a housing passage 25, into contact housing 23. An AC filter 27 is also assigned to contact bridge 19, which is designed as a toroidal core, through which contact bridge 19 extends. As is also apparent from FIG. 1, pulse width modulated inverter 15 (which is only roughly indicated), together with a PWM inverter housing cover 29, forms a one-part cover assembly 31, which is mounted on an upwardly open housing opening 33 of PWM inverter housing 13. Cover assembly 31 in FIG. 1 includes tool accesses 14, via which PWM inverter contacts 16 may be screwed to busbars 17 of contact bridge 19.

Figure 3:
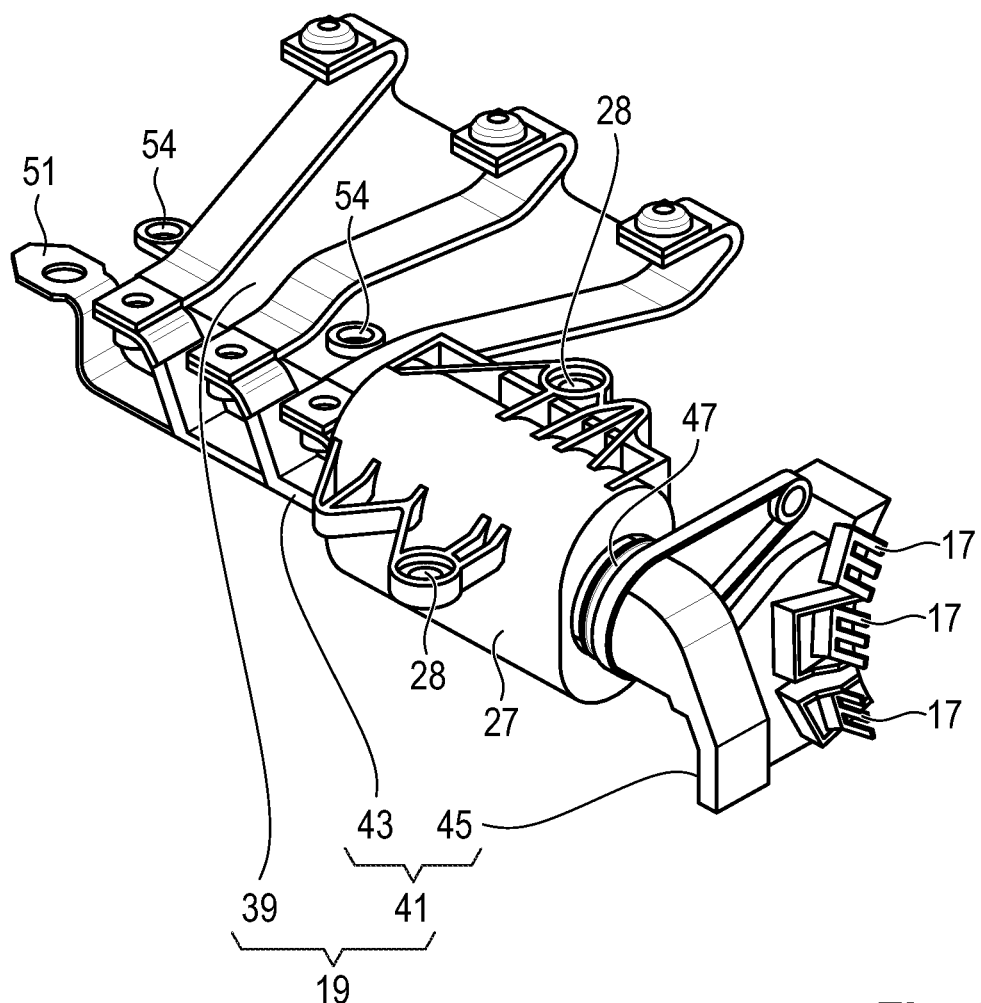
FIG. 3 shows the contact bridge alone, including the AC filter.

One core of the invention is that AC filter 27 is implemented as a component separate from pulse width modulated inverter 15. AC filter 27 is mounted on housing base 35 of PWM inverter housing 13 via screw points 28 independently of pulse width modulated inverter 15. AC filter 27 is arranged in a free space 37, which is present between PWM inverter housing base 35 and pulse width modulated inverter 15. A further core of the invention is that contact bridge 19 is provided with a two-part design, including a PWM inverter bridge part 39 (FIG. 3) and including a stator bridge part 41 (FIG. 3). The contacting between pulse width modulated inverter 15 and stator 5 is thus made up as a whole of a three-part assembly, which is made up of the two bridge parts 39, 41 as well as AC filter 27.

As is apparent from FIG. 3, stator bridge part 41 is an angle profile having a horizontal leg 43 and a vertical leg 45. In the assembled position, horizontal leg 43 of stator bridge part 41 extends into the PWM inverter housing interior and is guided through housing passage 25. A seal 47 is provided between housing passage 25 and horizontal leg 43 of stator bridge part 41, which separates the PWM inverter housing interior media-tight from the contact chamber.

Starting from the contact chamber, horizontal leg 43 of stator bridge part 41 is inserted through housing passage 25 into the PWM inverter housing interior in an assembly process, which is described later on (FIG. 5) in an insertion direction S. In this way, horizontal leg 43 of stator bridge part 41 is guided through AC filter 27 and extends beyond the latter with a projection 49 (FIG. 5) in insertion direction S. Busbars 17 of stator bridge part 41 are brought into contact with busbars 17 of PWM inverter bridge part 39 at projection 49 with the aid of screw connections 50 (FIG. 1).

Figure 2:
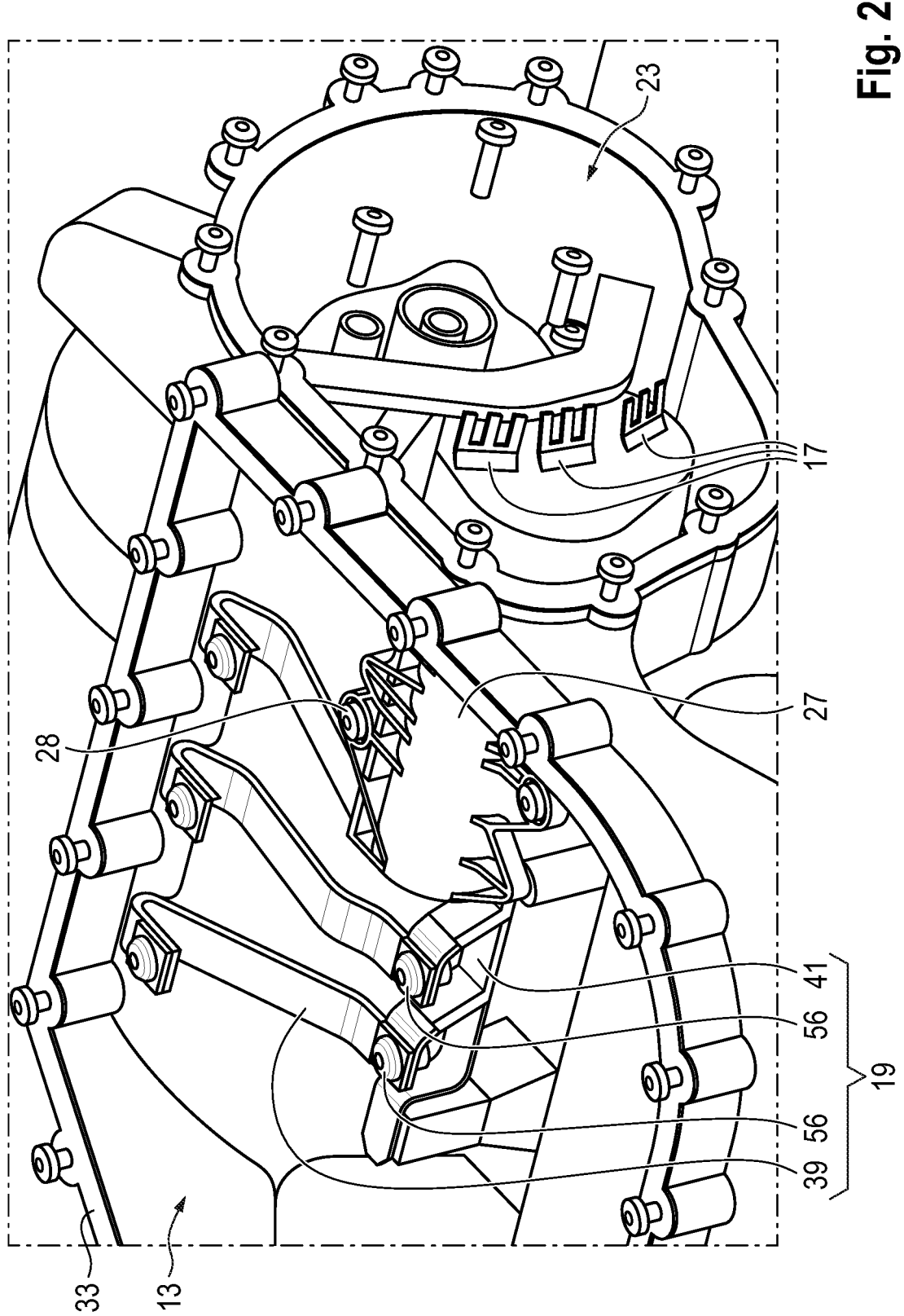
FIG. 2 shows a perspective view of a PWM inverter housing, the cover assembly being omitted.
Figure 4:
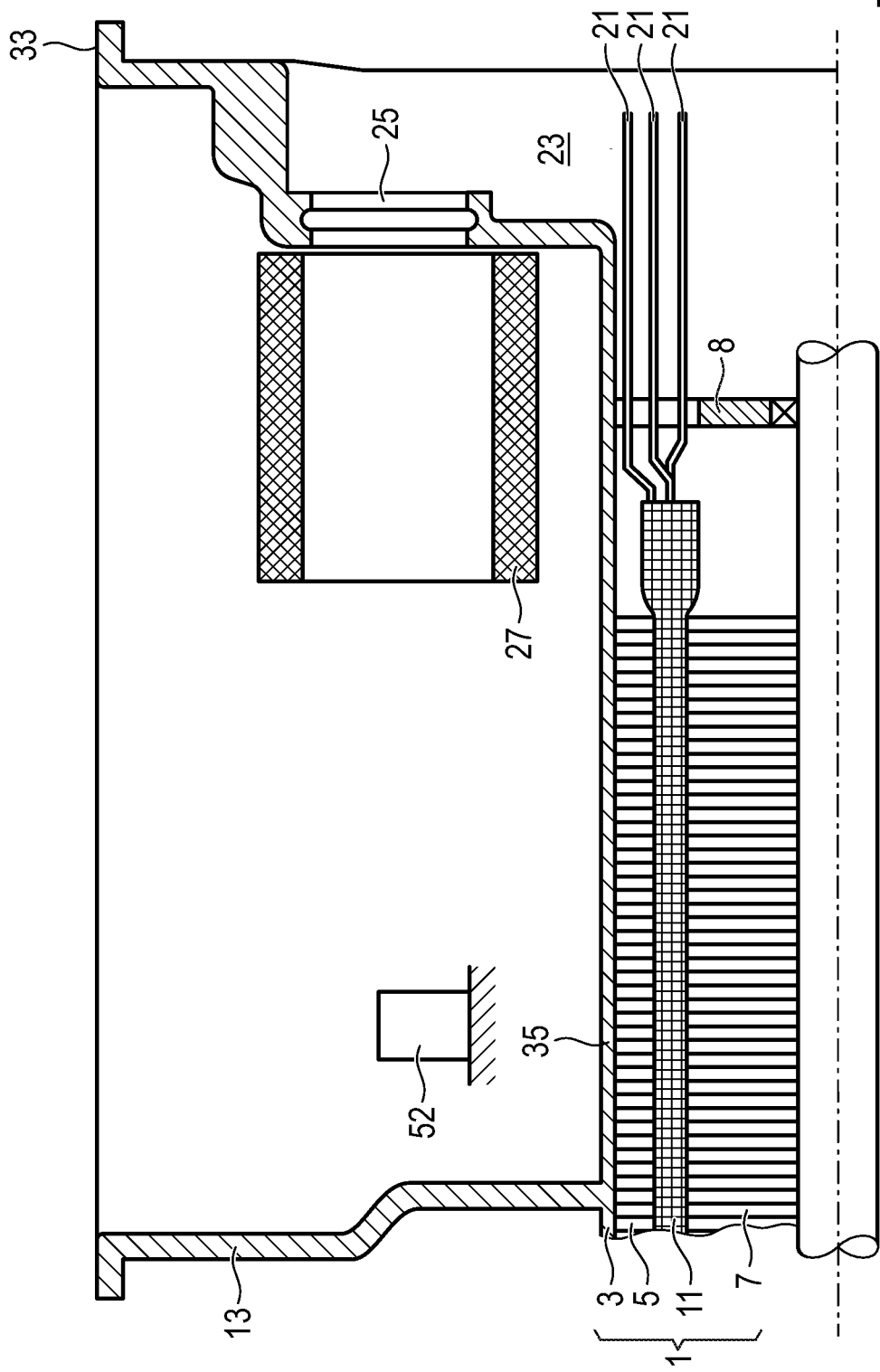
Figure 5:
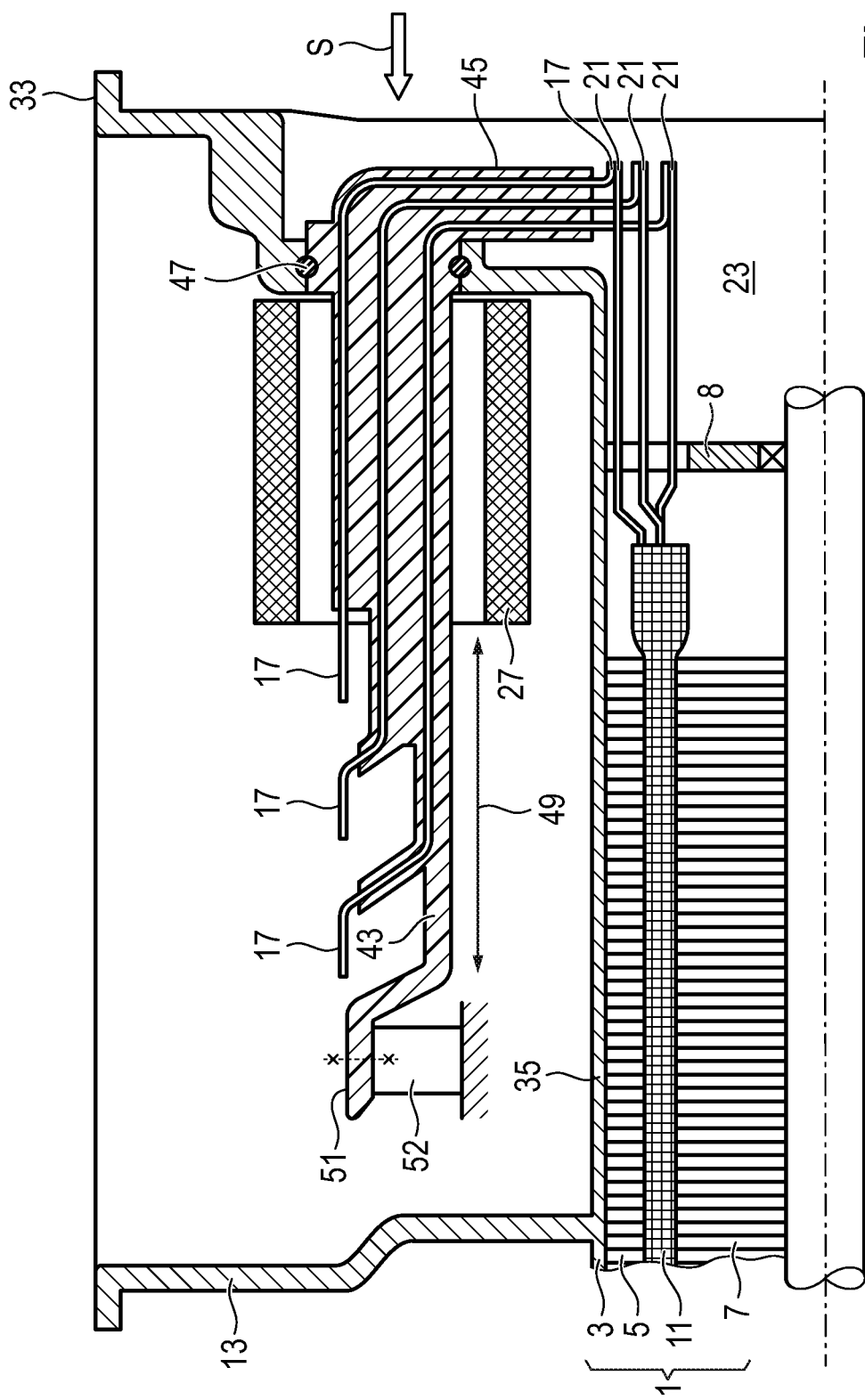

A method for the electrical contacting of pulse width modulated inverter 15 with stator 5 is described below, based on FIGS. 4 through 6. Accordingly, AC filter 27 is mounted on housing base 35 of still empty PWM inverter housing 13 via its screw points 28 (FIG. 3 and FIG. 2) in a first process step (FIG. 4). In a second process step, horizontal leg 43 of stator bridge part 41 is inserted from the contact chamber, through housing passage 25, into the PWM inverter housing interior in insertion direction S (FIG. 5). For a correct positioning of stator bridge part 41, horizontal leg 43 thereof has a positioning contour 51, which interacts with a mating contour 52 formed in the PWM inverter housing interior. In a third process step, vertical leg 45 of stator bridge part 41 is electrically connected to stator contacts 21. A fourth process step then follows, in which PWM inverter bridge part 39 is positioned within the PWM inverter housing interior and fastened to screw points 54 on the housing base (FIG. 3). In addition, busbars 17 of PWM inverter bridge part 39 are electrically interconnected to corresponding busbars 17 of stator bridge part 41 at screw points 56 (FIG. 1 or 2). In a final fifth process step (FIG. 6), cover assembly 31 is placed on upwardly open housing opening 33 of PWM inverter housing 13 and screwed to PMW inverter housing 13.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drive device for a vehicle, the drive device comprising:
   an electric machine having a stator housing, an outer circumference of the stator housing having a pulse width modulated (PWM) inverter housing formed thereon, PWM inverter having at least one PWM inverter contact being arranged in the PWM inverter housing, the at least one PWM contact being connected to a stator contact via a contact bridge; and
   an AC filter assigned to the contact bridge to reduce common mode flows and/or for EMC shielding, wherein the AC filter is a component separate from the PWM inverter and is mounted in the PWM inverter housing independently of the PWM inverter.

2. The drive device according to claim 1, wherein the AC filter is a toroidal core which encompasses the contact bridge, and the contact bridge is guided through the toroidal core with play.

3. The drive device according to claim 1, wherein the contact bridge is provided with a two-part design, including a PWM inverter bridge part on a PWM inverter side and including a stator bridge part so that the contacting between the PWM inverter and the stator is designed as a three-part assembly made up of the PWM inverter bridge part, the stator bridge part and the AC filter.

4. The drive device according to claim 3, wherein the AC filter is provided as a variant part which is adaptable to a power class of the PWM inverter, and/or the PWM inverter bridge part and the stator bridge part are used across power classes.

5. The drive device according to claim 3, wherein the PWM inverter housing is formed on an upper side of the stator housing, and/or a free space is formed in an interior of the PWM inverter housing between an underside of the PWM inverter and a base of the PWM inverter housing base in which the AC filter is arranged, and/or the PWM inverter bridge part and the stator bridge are electrically connected to each other in the interior of the PWM inverter housing in the free space.

6. The drive device according to claim 3, wherein the stator contact is arranged in a contact chamber or a wet chamber situated axially upstream from the stator housing, and/or an interior of the PWM inverter housing forms a dry chamber, and/or the stator bridge part is electrically connected to the stator contact in the contact chamber, and/or the stator bridge part is guided from the contact chamber into the interior of the PWM inverter housing via a housing passage.

7. The drive device according to claim 6, wherein a seal is formed between the housing passage and the stator bridge part, which separates the interior of the PWM inverter housing media-tight from the contact chamber.

8. The drive device according to claim 6, wherein the stator bridge part is designed as an angle profile having a horizontal leg and a vertical leg, and the horizontal leg of the stator bridge part extends into the interior of the PWM inverter housing and is guided through the housing passage, and the vertical leg of the stator bridge part extends into the contact chamber and is electrically connected to the stator contact.

9. The drive device according to claim 1, wherein the PWM inverter, together with a PWM inverter housing cover, forms a one-part cover assembly, which is mounted on an upwardly open housing opening of the PWM inverter housing.

10. A method for the electrical contacting of a PWM inverter comprising a stator of an electric machine of the drive device according to claim 1, the method comprising:
    mounting the AC filter in an empty interior of the PWM inverter housing as a separate component;
    inserting a stator bridge part of the contact bridge in an insertion movement from a contact chamber through a housing passage into the interior of the PWM inverter housing so that a horizontal leg of the stator bridge part extends beyond the AC filter with a projection in an insertion direction;
    electrically connecting a vertical leg of the stator bridge part to the stator contact;
    mounting a PWM inverter bridge part of the contact bridge in the interior of the PWM inverter housing and electrically connecting the PWM inverter bridge part to the horizontal leg of the stator bridge part or to the projection of the horizontal leg; and
    inserting the PWM inverter into the interior of the PWM inverter housing and electrically connecting the PWM inverter to the PWM inverter bridge part.

\* \* \* \* \*